(12) United States Patent
Fuh et al.

(10) Patent No.: US 7,493,603 B2
(45) Date of Patent: **\*Feb. 17, 2009**

(54) ANNOTATED AUTOMATON ENCODING OF XML SCHEMA FOR HIGH PERFORMANCE SCHEMA VALIDATION

(75) Inventors: You-Chin Fuh, San Jose, CA (US); Ning Wang, Irvine, CA (US); Yun Wang, Saratoga, CA (US); Guogen Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 730 days.

This patent is subject to a terminal disclaimer.

(21) Appl. No.: 10/418,658

(22) Filed: Apr. 16, 2003

(65) Prior Publication Data

US 2004/0073870 A1      Apr. 15, 2004

Related U.S. Application Data

(60) Provisional application No. 60/418,673, filed on Oct. 15, 2002.

(51) Int. Cl.
*G06F 9/44* (2006.01)
(52) U.S. Cl. ........................... 717/143; 717/136
(58) Field of Classification Search .............. None
See application file for complete search history.

(56) References Cited

U.S. PATENT DOCUMENTS 4,864,502 A      9/1989   Kucera et al.
6,101,512 A  *   8/2000   DeRose et al. .............. 715/514
6,353,896 B1     3/2002   Holzmann et al.
6,418,446 B1     7/2002   Lection et al.
6,480,865 B1    11/2002   Lee et al.

(Continued)

FOREIGN PATENT DOCUMENTS

JP           200167348        3/2001

(Continued)

OTHER PUBLICATIONS

Wang et al., An Efficient XML Schema Typing System, Nov. 2003, pp. 1-20.*

(Continued)

*Primary Examiner*—Michael J. Yigdall
(74) *Attorney, Agent, or Firm*—IP Authority, LLC; Ramraj Soundararajan; Gregory Plow

(57) ABSTRACT

A method and system for Extensible Markup Language (XML) schema validation, includes: loading an XML document into a runtime validation engine, where the runtime validation engine includes an XML schema validation parser; loading an annotated automaton encoding (AAE) for an XML schema definition into the XML schema validation parser; and validating the XML document against the XML schema definition by the XML schema validation parser utilizing the annotated automaton encoding. Each XML schema definition is compiled once into the AAE format, rather than being compiled each time an XML document is validated, and thus significant time is saved. The code for the runtime validation engine is fixed and does not vary depending on the XML schema definition, rather than varying for each XML schema definition, and thus space overhead is minimized. Flexibility in the validation process is provided without compromising performance.

35 Claims, 16 Drawing Sheets

U.S. PATENT DOCUMENTS

| | | | |
|---|---|---|---|
| 6,519,617 | B1 | 2/2003 | Wanderski et al. |
| 6,549,221 | B1 | 4/2003 | Brown et al. |
| 6,591,260 | B1 | 7/2003 | Schwarzhoff et al. |
| 6,598,015 | B1 | 7/2003 | Peterson et al. |
| 6,598,219 | B1 | 7/2003 | Lau |
| 6,601,075 | B1 | 7/2003 | Huang et al. |
| 6,604,099 | B1 | 8/2003 | Chung et al. |
| 6,643,652 | B2 | 11/2003 | Helgeson et al. |
| 6,675,355 | B1 * | 1/2004 | Demopoulos et al. ....... 715/513 |
| 6,799,194 | B2 * | 9/2004 | Grosz et al. ................. 708/446 |
| 6,966,027 | B1 | 11/2005 | Krasinski |
| 7,055,093 | B2 | 5/2006 | Tozawa et al. |
| 7,165,216 | B2 | 1/2007 | Chidlovskii et al. |
| 2001/0054172 | A1 * | 12/2001 | Tuatini .......................... 717/1 |
| 2002/0019824 | A1 | 2/2002 | Holder et al. |
| 2002/0019837 | A1 | 2/2002 | Balnaves |
| 2002/0073091 | A1 | 6/2002 | Jain et al. |
| 2002/0078406 | A1 | 6/2002 | Kondoh et al. ................ 714/48 |
| 2002/0087571 | A1 | 7/2002 | Stapel et al. |
| 2002/0099738 | A1 * | 7/2002 | Grant .......................... 707/513 |
| 2002/0129059 | A1 | 9/2002 | Eck |
| 2002/0138517 | A1 | 9/2002 | Mory et al. |
| 2002/0157023 | A1 | 10/2002 | Callahan et al. |
| 2002/0169565 | A1 | 11/2002 | Westbrook et al. |
| 2002/0184401 | A1 | 12/2002 | Kadel, Jr. et al. |
| 2003/0005001 | A1 | 1/2003 | Kataoka |
| 2003/0046317 | A1 * | 3/2003 | Cseri et al. ................... 707/513 |
| 2003/0070158 | A1 * | 4/2003 | Lucas et al. .................. 717/114 |
| 2003/0093402 | A1 | 5/2003 | Upton |
| 2003/0110279 | A1 | 6/2003 | Banerjee et al. |
| 2003/0110311 | A1 | 6/2003 | Kumar |
| 2003/0115548 | A1 | 6/2003 | Melgar |
| 2003/0154444 | A1 | 8/2003 | Tozawa et al. |
| 2003/0163603 | A1 | 8/2003 | Fry et al. |
| 2003/0182452 | A1 | 9/2003 | Upton |
| 2004/0006741 | A1 * | 1/2004 | Radja et al. .................. 715/513 |
| 2004/0073870 | A1 | 4/2004 | Fuh et al. |
| 2005/0060645 | A1 | 3/2005 | Raghavachari et al. |
| 2005/0086584 | A1 * | 4/2005 | Sampathkumar et al. . 715/501.1 |
| 2005/0177543 | A1 * | 8/2005 | Chen et al. ..................... 707/1 |

FOREIGN PATENT DOCUMENTS

| | | |
|---|---|---|
| JP | 2003150422 | 5/2003 |
| WO | WO 0114951 | 3/2001 |
| WO | WO 02/50691 A1 | 6/2002 |

OTHER PUBLICATIONS

Sun Microsystems, Java Architecture for XML Binding (JAXB), Jan. 2003, pp. 1-11.*

Feng, Ding et al., "Design and Implementation of the Extensible Markup Language Parser," Journal of Xi'An Jiaotong University, vol. 36, no. 8, Aug. 2002, p. 1 and 868-870.

Nelson, Mark, "Validation with MSXML and XML Schema," pp. 1-4.

Cooper, Clark, "What is Expat?" XML.com, Sep. 1999, 9 pgs.

Shanmugasundaram et al., "Efficiently Publishing Relational Data as XML Documents," The VLDB Journal 2001, pp. 133-154.

Wang et al., "An XML Typing Module for XML Schema Validation and XML Typing," Association for Computing Machinery, Inc., 2003.

Bouchou et al., "Extending Tree Automata to Model XML Validation Under Element and Attribute Constraints," pp. 184-190. Document modified Mar. 23, 2003. Available online.

* cited by examiner

```
400
<schema xmlns="http://www.w3.org/2001/XMLSchema"  ← 402
        xmlns:p="http://www.foo.com/personnel"  ← 404
        targetNamespace="http://www.foo.cm/personnel"> ← 405
                    408      410
  <annotation>
    <documentation xml:lang="en">
406        Personnel Directory Records for foo.com
           Copyright 2002 foo.com. All rights reserved.
    </documentation>
  </annotation>

<element name='personnel'> ← 412
    <complexType>         414                416
      <sequence>
        <element name='employee' minOccurs='1'  maxOccurs='unbounded'>
          <complexType>          418        420
            <sequence>
              <element name='lastname' type='string' maxOccurs='1'/>
              <element name='firstname' type='string' maxOccurs='1'/>
              <element ref='notes' minOccurs='0'/>
            </sequence>
422 →       <attribute name='serno'      type='integer'/>
            <attribute name='userid'     type='p:USERID_TYPE'/>
            <attribute name='department' type='string'/>
          </complexType>                              424
        </element>
      </sequence>           430
      <unique name='dummy1'>
        <selector xpath='personnel/employee'/>
        <field xpath='@serno'/>
      </unique>
    </complexType>
  </element>

<element name="notes"  type="string"/> ← 426

<!-- Customized Simple data type declaration -- >
  <simpleType name='USERID_TYPE'> ← 428
    <restriction base='string'>
    <pattern value="[a-zA-Z]{1}[1-9a-zA-Z]*"/>
    </restriction>
  </simpleType>
</schema>
```

FIG. 4 personnel: employees employees: employee
 | employee employee employee: lastname firstname notes_01 notes_01: espilon
 | notes

FIG. 6 personnel: PS employees PE employees: employee
 | employee employees employee: ES lastname firstname notes_01 EE notes_01: epsilon
 | notes lastname:   LS LE firstname:  FS FE notes:      NS NE

FIG. 7

| Personnel Element Annotation Record 809 |
|---|

STACK

FIG. 15A

| Employee Element Annotation Record 816 |
|---|
| Personnel Element Annotation Record 809 |

STACK

FIG. 15B

| Lastname Element Annotation Record 829 |
|---|
| Employee Element Annotation Record 816 |
| Personnel Element Annotation Record 809 |

STACK

FIG. 15C

| Firstname Element Annotation Record 837 |
|---|
| Employee Element Annotation Record 816 |
| Personnel Element Annotation Record 809 |

STACK

FIG. 15D

| Notes Element Annotation Record 843 |
|---|
| Employee Element Annotation Record 816 |
| Personnel Element Annotation Record 809 |

STACK

FIG. 15E

```
<complexType name="employeeType">
   <sequence>
       <element name='lastname' type='string' maxOccurs='1'/>
       <element name='firstname' type='string' maxOccurs='1'/>
       <element ref='notes' minOccurs='0'/>
   </sequence>
</complexType>

<complexType name="regularEmployee">
   <complexContent>
       <extension base="p:employeeType">
          <sequence>
              <element name="salary" type="decimal"/>
          </sequence>
       </extension>
   </complexContent>
</complexType>

<complexType name="tempEmployee">
   <complexContent>
       <extension base="p:employeeType">
          <sequence>
              <element name="wage" type="decimal"/>
          <sequence>
       </extension>
   </complexContent>
</complexType>

<element name='employee' type="p:employeeType"
       minOccurs='1' maxOcurs='unbounded'/>
```

FIG. 17

ANNOTATED AUTOMATON ENCODING OF XML SCHEMA FOR HIGH PERFORMANCE SCHEMA VALIDATION

CROSS REFERENCE TO RELATED APPLICATION

This application is claiming under 35 USC 119(e) the benefit of provisional patent application Ser. No. 60/418,673, filed on Oct. 15, 2002.

FIELD OF THE INVENTION

The present invention relates to extensible mark-up language (XML) schemas, and more particularly to the validation of XML documents according to an XML schema.

BACKGROUND OF THE INVENTION

Extensible mark-up language (XML) schemas are well known in the art. They allow users to define complex structured XML data objects, which facilitates the wide spread use of the XML format in data storage and processing in databases. As each XML document is offered, they must be validated against its XML schema definition to ensure compliance prior to their use in data storage and processing.

Conventionally, two major approaches to XML schema validation are used. First is a general-purpose schema validation parser. In this approach, the parser receives the XML schema definition and the XML document as input, parses the XML document into a tree format, parses the XML schema definition into a schema tree format, and then traverses the XML document tree to check it against the XML schema tree. The same general-purpose schema validation parser is used for many different XML schemas. Although this approach is flexible in that it can validate against many different XML schemas, this approach typically has poor performance.

A second approach is to generate an XML schema validation parser code based on a particular XML schema definition. The XML schema validation parser code is compiled into executable code, which is used to validate an XML document against the particular XML schema definition. Although this approach can be faster than the first approach, there can be a large number of validation parsers when there are a large number of XML schema definitions, incurring space overhead. It is also inflexible as each XML schema validation parser can only validate against a particular XML schema.

Accordingly, there exists a need for an improved method and system for XML schema validation. The improved method and system should provide high performance without incurring high space overhead. The present invention addresses such a need.

SUMMARY OF THE INVENTION

A method and system for Extensible Markup Language (XML) schema validation, includes: loading an XML document into a runtime validation engine, where the runtime validation engine includes an XML schema validation parser; loading an annotated automaton encoding (AAE) for an XML schema definition into the XML schema validation parser; and validating the XML document against the XML schema definition by the XML schema validation parser utilizing the annotated automaton encoding. Each XML schema definition is compiled once into the AAE format, rather than being compiled each time an XML document is validated, and thus significant time is saved. The code for the runtime validation engine is fixed and does not vary depending on the XML schema definition, rather than varying for each XML schema definition, and thus space overhead is minimized. Flexibility in the validation process is provided without compromising performance.

BRIEF DESCRIPTION OF THE FIGURES

FIG. 4 illustrates an example XML schema definition.

FIG. 6 illustrates a structure of the example XML schema definition in a context-free grammar in accordance with the present invention.

FIG. 7 illustrates an augmentation of the context-free grammar in FIG. 6 with start tag tokens and end tag tokens in accordance with the present invention.

FIGS. 15A-15E illustrate contents of the stack during the runtime validation process performed by the runtime validation engine in accordance with the present invention.

FIG. 17 illustrates an example of derived types for an XML schema definition.

DETAILED DESCRIPTION

The present invention provides an improved method and system for XML schema validation. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Introduction

The improved method and system in accordance with the present invention compiles XML schema definitions into an Annotated Automaton Encoding (AAE) format, which are stored in a disk or database. Each XML schema definition is compiled once into the AAE format. When an XML document is validated, the XML document and the appropriate XML schema definition in AAE format are loaded into a runtime validation engine. The runtime validation engine comprises a generic XML parser and a runtime schema validation parser. The code for the runtime validation engine is fixed and does not vary depending on the XML schema definition. The generic XML parser performs a low level validation while the runtime schema validation parser performs a high level validation of the XML document against the XML schema definition in AAE format. The output of the runtime validation engine is a validation pass or fail.

To more particularly describe the features of the present invention, please refer to FIGS. 1 through 17 in conjunction with the discussion below.

Figure 1:
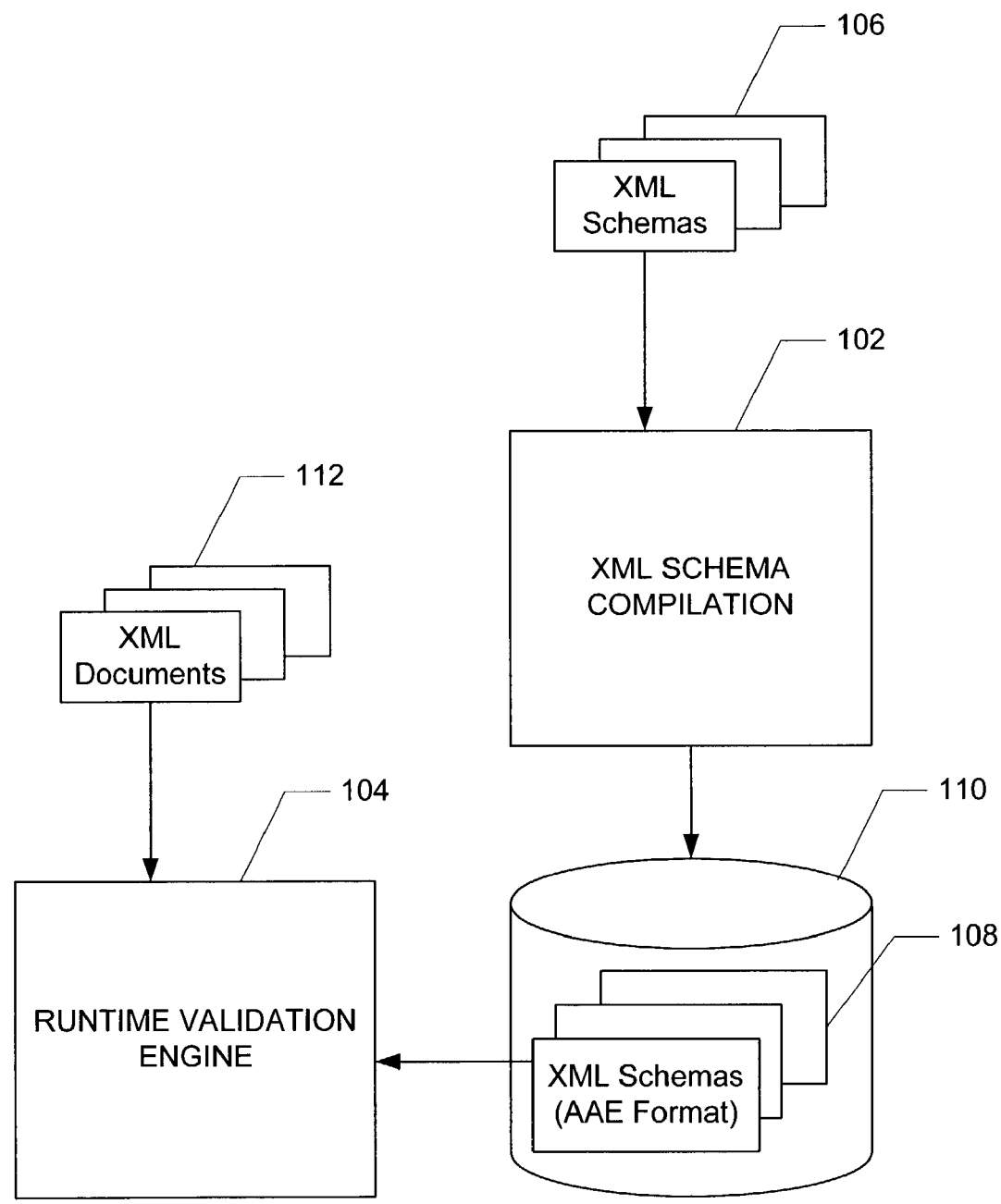
FIG. 1 illustrates a preferred embodiment of an XML schema validation system in accordance with the present invention.

FIG. 1 illustrates a preferred embodiment of an XML schema validation system in accordance with the present invention. The system comprises two sets of logic, an XML schema compilation 102 and a runtime validation engine 104.

The XML schema compilation 102 takes XML schema definitions 106 as input and provides each XML schema in an Annotated Automaton Encoding (AAE) format 108 as output. The XML schema definitions in AAE format 108 are stored on a disk or in a database 110 for easy retrieval at a later time. The AAE format comprises a format of a parsing table typically obtained from a Look Ahead Left to Right (LALR (1)) parser generator but with the addition of annotations. Annotations are the attributes for element nodes and data type constraints for element nodes and attributes of the XML schema tree created for a particular XML schema definition. The XML schema compilation 102 and the AAE format are described further below with reference to FIGS. 2-9.

The runtime validation engine 104 takes an XML document 112 and its corresponding XML schema definition 108 in AAE format as input and provides a validation pass or fail as output. The runtime validation engine 104 is described further below with reference to FIGS. 10-14.

XML Schema Compilation

Figure 2:
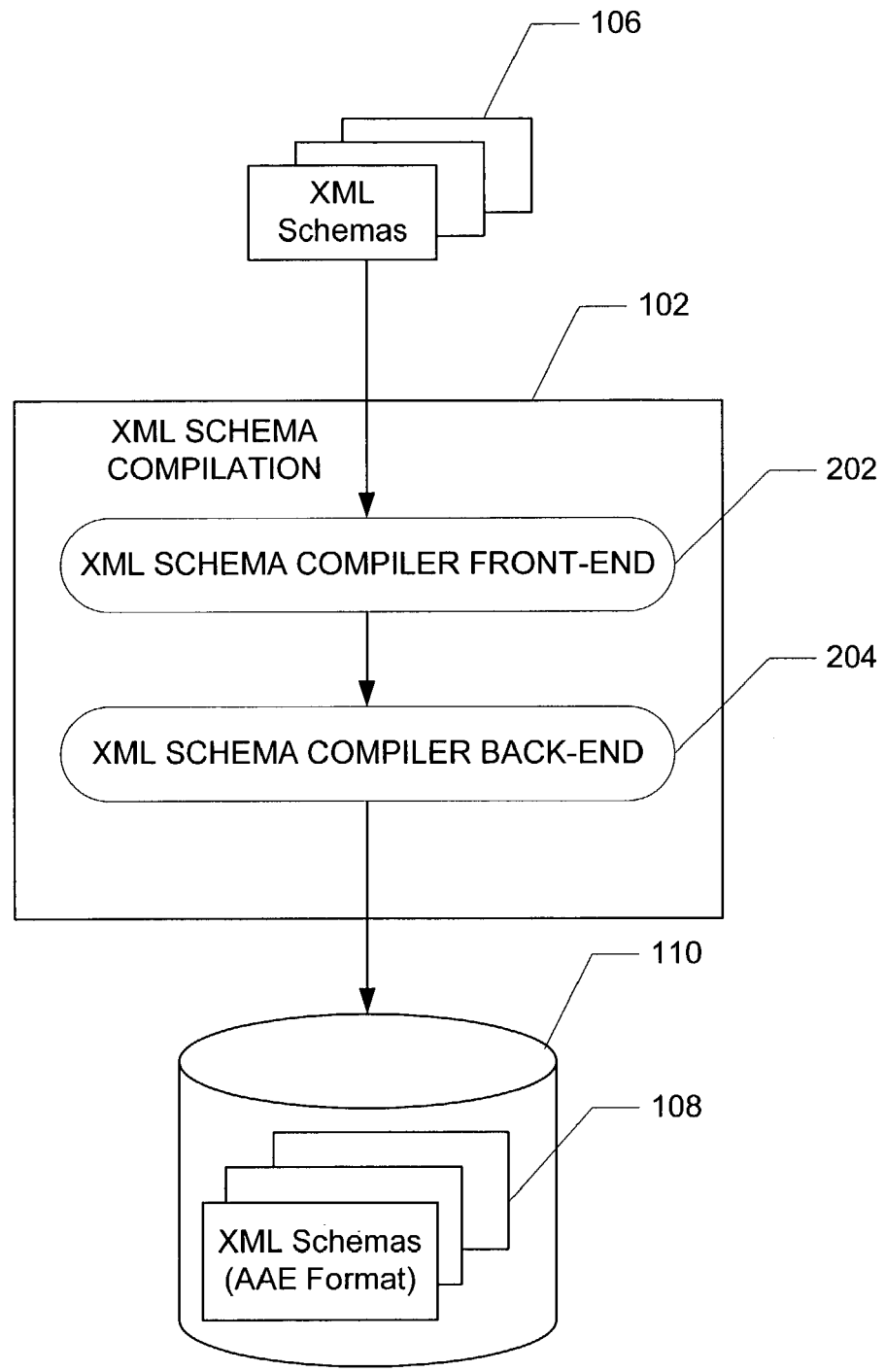
FIG. 2 illustrates in more detail the XML schema compilation in accordance with the present invention.
Figure 3:
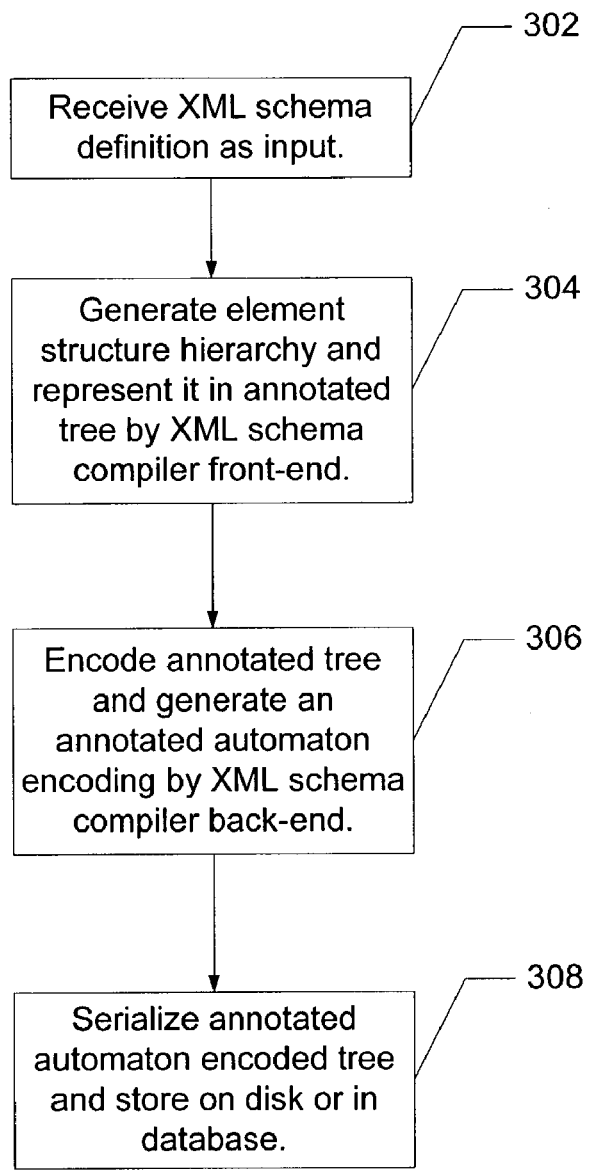
FIG. 3 is a flowchart illustrating a preferred embodiment of the XML schema compilation process in accordance with the present invention.
Figure 5:
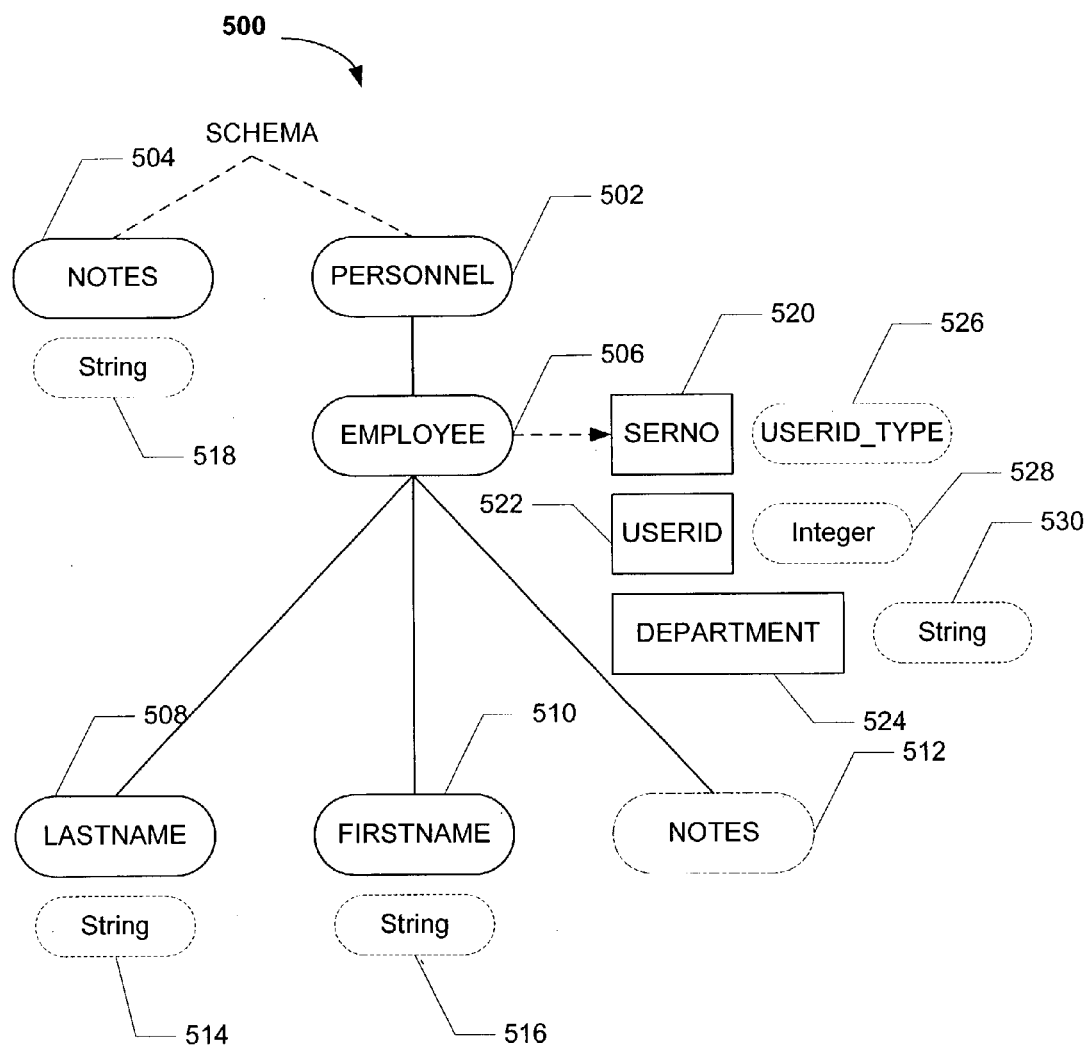
FIG. 5 illustrates an element structure hierarchy for the example XML schema definition represented in an annotated tree in accordance with the present invention.

FIG. 2 illustrates in more detail the XML schema compilation 102 in accordance with the present invention. The XML schema compilation 102 comprises an XML schema compiler front-end 202 and an XML schema compiler back-end 204. FIG. 3 is a flowchart illustrating a preferred embodiment of the XML schema compilation process in accordance with the present invention.

Referring to both FIGS. 2 and 3, the XML schema compiler front-end 202 receives an XML schema definition 106 as input, via step 302. The XML schema compiler front-end 202 then generates an element structure hierarchy and represents it in an annotated tree, via step 304. The nodes of the tree are the element nodes and the edges are the structural relationships among the nodes. The annotations are the attributes for the element nodes and data type constraints for the element nodes and attributes. This annotated tree is described further below.

Next, the XML schema compiler back-end 204 encodes the annotated tree and generates an annotated automaton encoding, via step 306. The annotated automaton encoding is then serialized and stored on a disk or in a database, via step 308. The annotated automaton encoding is thus the XML schema definition in AAE format 108.

FIGS. 4-9 illustrate an example of the method implemented by the XML schema compilation 102 in accordance with the present invention. FIG. 4 illustrates an example XML schema definition 400. The XML schema definition 400 comprises a default XML namespace 402, a namespace declaration 404, and a registered target namespace 405. For security reasons, the XML schema may be registered and is accessed at an alternative location referenced by the registered XML schema reference 404. The XML schema definition 400 also comprises annotations 406 for documentation purposes. In this example, the annotation 406 is defined as including an element 408 named "documentation" with an attribute 410 of "xml:lang='en'".

The XML schema definition 400 further comprises global element declarations, such as personnel 412 and notes 426. The personnel global element 412 is declared to be a complex type and to have a sequence of sub-elements named employee 414. The employee sub-element 414 is declared to be a complex type and to have semantic constraints 416. The employee sub-element 414 itself is declared to have sub-elements 418, each with its own syntactical constraints 420. In this example, these sub-elements are lastname, firstname, and notes, with each being of a simple type (string). The employee sub-element 414 is also declared to have several attributes 422, each defined to be of a simple type 424. In this example, the attributes 422 include serno of type integer, userid of type USERID_TYPE, and department of type string. The integer and string types are predefined. The USERID_TYPE type is not. Its definition is set forth in the XML schema definition at 428.

The XML schema compiler front-end 202 receives this XML schema definition 400 as input, via step 302. The XML schema compiler front-end 202 then generates an element structure hierarchy for the XML schema definition 400 and represents it in an annotated tree 500, illustrated in FIG. 5. The solid lines connect the element nodes of the tree 500. The dashed lines connect element nodes to attribute annotations.

For example, solid lines connect the personnel node 502 to the employee node 506, and the employee node 506 to the lastname 508, firstname 510, and notes 512 nodes. The tree 500 illustrates that notes and personnel are global elements, and thus they are at the first level of nodes. Employee is a sub-element of personnel, and thus its node is connected by a solid line to the personnel node at a second level. Lastname, firstname, and notes are sub-elements of employee, and thus their nodes 508-512 are connected by solid lines to the employee node 506 at a third level. The "string" dashed ovals 514-518 proximate to the lastname 508, firstname 510, and notes 504 nodes are data type annotation nodes that represent the data types for their respective corresponding nodes.

The tree 500 further illustrates that the employee node 506 is defined to have attributes, represented by the serno square 520, userid square 522, and department square 524. The USERID_TYPE 526, Integer 528, and String 530 dashed ovals proximate to the squares are their corresponding type annotation nodes.

Figure 8:
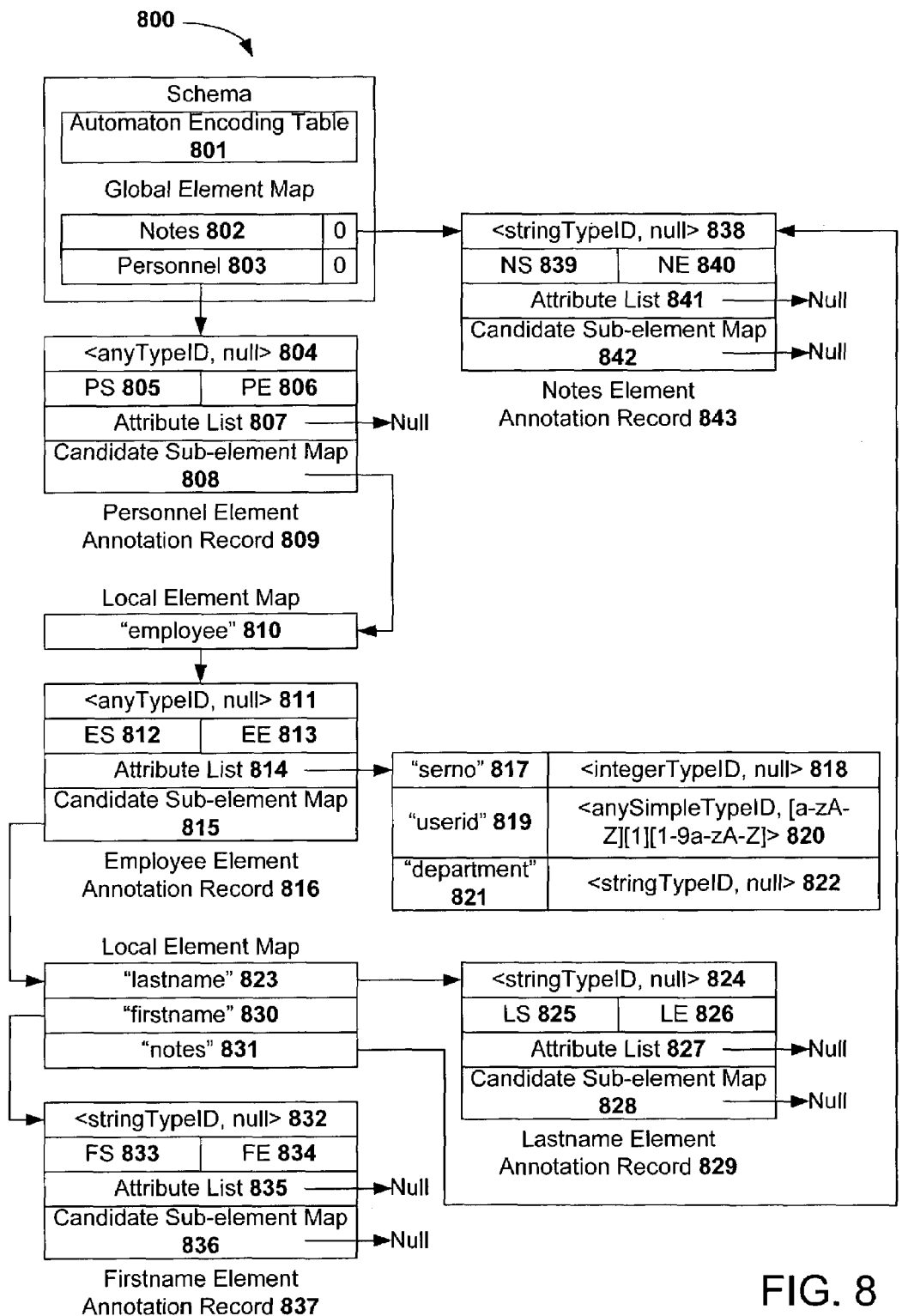
FIG. 8 illustrates an annotation portion of the annotated automaton encoding for the example XML schema definition in accordance with the present invention.

Once the annotated tree 500 is generated for the XML schema definition 400, the XML schema compiler back-end 204 encodes the annotated tree 500 and generates an annotated automaton encoding, via step 306. In encoding the annotated tree 500, the XML schema compiler back-end 204 first represents the element constraints of the annotated tree 500, i.e. the tree structure specified by the solid lines, in a context-free grammar (CFG), as illustrated in FIG. 6. Then, it augments the CFG by appending a start tag token as a prefix for each element and by appending an end tag token as a suffix for each element, as illustrated in FIG. 7. For example, for the personnel element, a start tag token PS and an end tag token PE are appended. For the employee element, a start tag token ES and an end tag token EE are appended. Start and end tag tokens are similarly appended to the elements lastname, firstname, and notes. An LALR(1) parser generator algorithm is then used to generate a parsing table or state transition table. Another algorithm is then used to construct the annotation records from the annotations of the tree illustrated in FIG. 5. The annotation portion of a resulting state transition graph for the example XML schema definition 400 is illustrated in FIG. 8. By generating such an annotated automaton encoding, validation of an XML data object involves checking if the sequence of the start or end tags conform to the grammar illustrated in FIG. 7.

Figure 9:
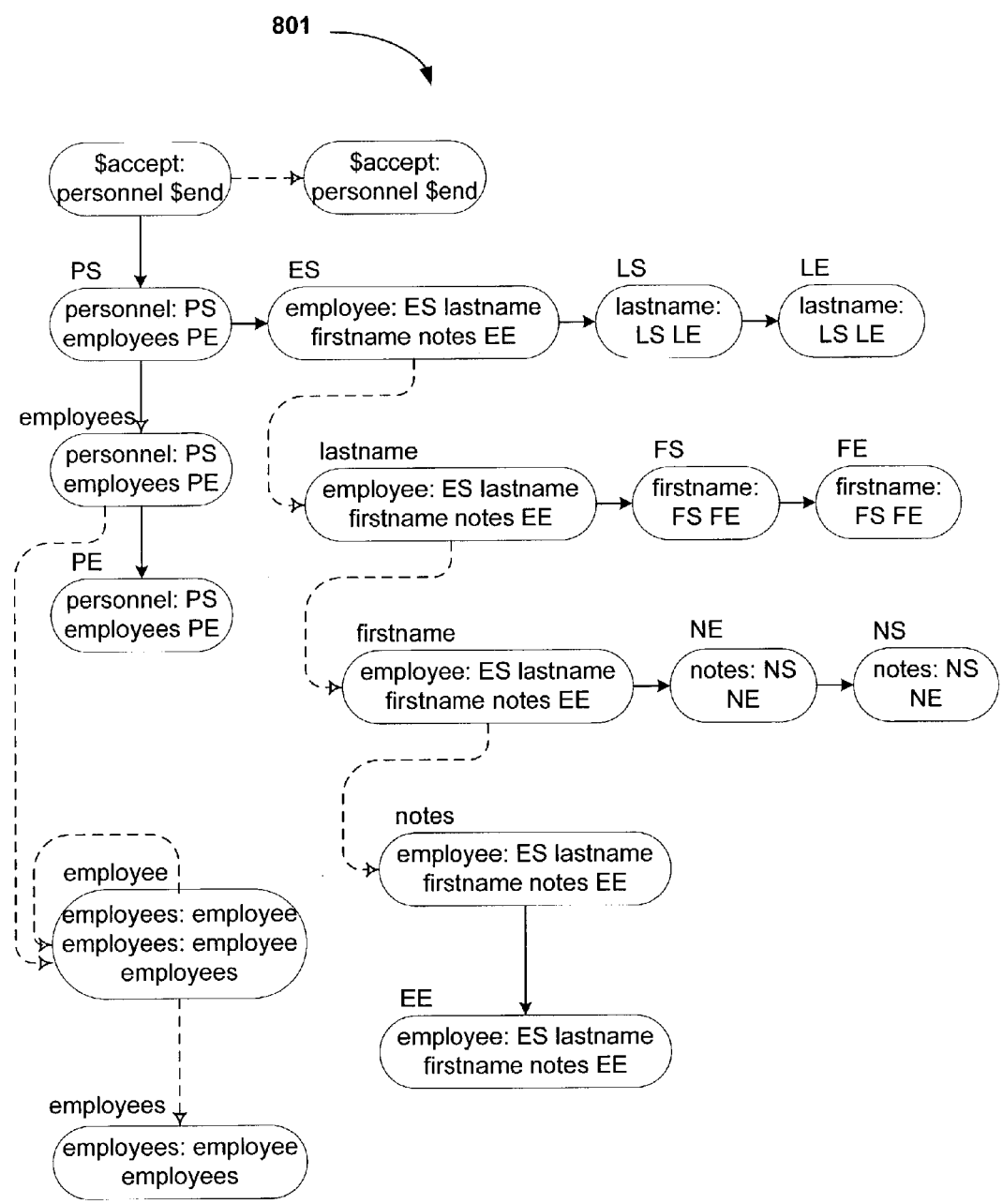
FIG. 9 illustrates the state transition graph for the automaton encoding table for the example XML schema definition in accordance with the present invention.

Referring to FIG. 8, the example XML schema definition 400 includes an automaton encoding table 801 and a global element map comprising the global elements notes 802 and personnel 803. FIG. 9 illustrates the state transition graph for the automaton encoding table 801 for the example XML schema definition 400. For the sake of simplicity, FIG. 9 illustrates only the SHIFT edges for the definition 400 and omits the REDUCE edges.

Returning to FIG. 8, the global element map comprises the notes element name 802 and the personnel element name 803. They in turn comprise pointers to the annotation record 843 and 809 for the notes 802 and personnel 803 elements, respectively. The personnel element annotation record 809 comprises the scanner ID for its element content and argument 804 (<anyTypeID, null>), its start tag token 805 (PS), its end tag token 806 (PE), an attribute list 807, and a candidate sub-element map 808. The attribute list 807 for the personnel element annotation record 809 is null. Its candidate sub-element map 808 comprises pointers to its local element map. The local element map 810 comprises the employee element name, which in turn comprises a pointer to the employee element annotation record 816.

The employee element annotation record 816 comprises the scanner ID for its element content and argument 811 (<anyTypeID, null>), its start tag token 812 (ES), its end tag token 813 (EE), an attribute list 814, and a candidate sub-element map 815. According to the XML schema definition 400, the attribute list 814 comprises three attributes, serno, userid, and department. Thus, the attribute list 814 comprises pointers to the serno attribute name 817 and the scanner ID for its value and argument 818 (<integerTypeID, null>) the userid attribute name 819 and the scanner ID for its value and argument 820 (<anySimpleTypeID, [a-zA-Z][1][1-9a-zA-Z]>), and the department attribute name 821 and the scanner ID for its value and argument 822 (<stringTypeID, null>).

The candidate sub-element map 815 for the employee element annotation record 816 comprises pointers to its local element map, which comprises pointers to the annotation records of the sub-elements of the employee element. According to the XML schema definition 400, the sub-elements of the employee element comprises lastname,firstname, and notes elements. Each in turn comprises pointers to the lastname element annotation record 829, the firstname element annotation record 837, and the notes element annotation record 843, respectively.

The lastname element annotation record 829 comprises the scanner ID for its content and argument 824 (<stringTypeID, null>), its start tag token 825 (LS), its end tag token 826 (LE), an attribute list 827, and a candidate sub-element map 828. According to the XML schema definition 400, the lastname element has no attributes and no sub-elements, thus its attribute list 827 and its candidate sub-element map 828 are null.

The firstname element annotation record 837 comprises the scanner ID for its content and arguments 832 (<stringTypeID, null>), its start tag token 833 (FS), its end tag token 834 (FE), an attribute list 835, and a candidate sub-element map 836. According to the XML schema definition 400, the firstname element has no attributes and no sub-elements, thus its attribute list 835 and its candidate sub-element map 836 are null.

The notes element annotation record 843 comprises the scanner ID for its content and argument 838 (<stringTypeID, null>), its start tag token 839 (NS), its end tag token 840 (NE), an attribute list 841, and a candidate sub-element map 842. According to the XML schema definition 400, the notes element has no attributes and no sub-elements, thus its attribute list 841 and candidate sub-element map 842 are null.

The annotated automaton encoding 800 is used to validate XML documents against the XML schema definition 400, as described further below.

Runtime Validation Engine

Figure 10:
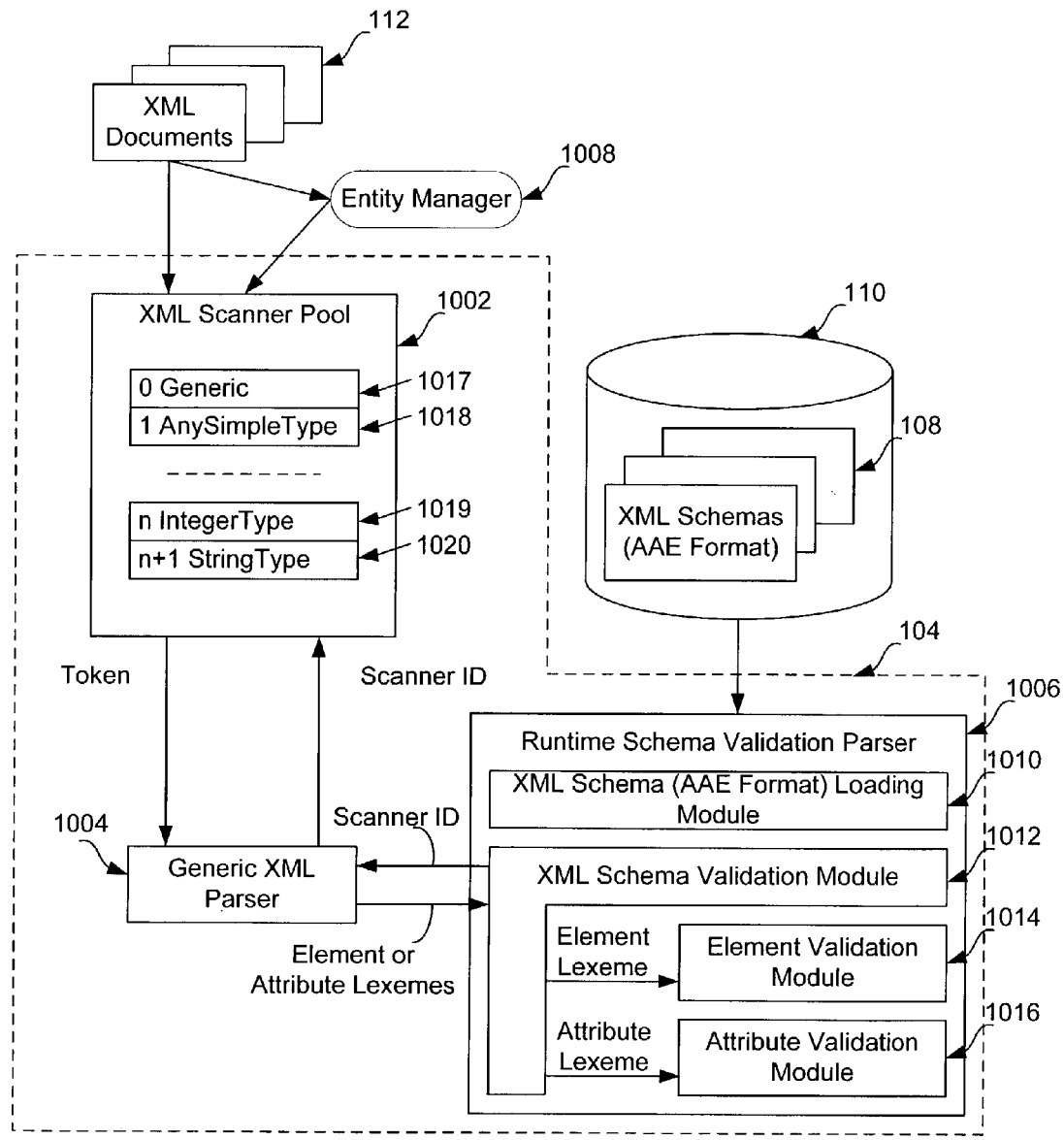
FIG. 10 illustrates in more detail the runtime validation engine in accordance with the present invention.

FIG. 10 illustrates in more detail the runtime validation engine 104 in accordance with the present invention. The runtime validation engine 104 comprises an XML scanner pool 1002, a generic XML parser 1004, and a runtime schema validation parser 1006. The XML scanner pool 1002 comprises a generic scanner 1017 and other scanners 1018-1020 for specific simple data types. The generic scanner 1017 is capable of scanning all lexical tokens, however, its performance is limited. Scanners 1018-1020 for specific data types provide greater performance. For example, a scanner 1019 for the integer type and a scanner 1020 for the string type may be part of the XML scanner pool 1002. In the preferred embodiment, an AnySimpleType scanner 1018 is used as a generic scanner for any simple data types. Each scanner 1017-1020 have a unique scanner ID (0, 1, . . . n, n+1). The scanners are called by the generic XML parser 1004 to tokenize an input XML document 112. Which scanner to call is determined by the runtime schema validation parser 1006 according to the XML schema in AAE format 108.

The generic XML parser 1004 accepts the tokens from the scanners and checks the basic XML grammar. If the token is an element token, i.e., a start tag name or an end tag name, or if the token is an attribute token, they are forwarded to the runtime schema validation parser 1006 as a lexeme. The runtime schema validation parser 1006 validates the element and attribute lexemes against the XML schema definition in AAE format. The generic XML parser 1004 thus performs a low level validation, while the runtime schema validation parser 1006 performs a high level validation according to the schema structure in CFG (see FIG. 6).

The runtime schema validation parser 1006 comprises an XML schema loading module 1010, which loads the appropriate XML schema in AAE format 108 from the disk or database 110. The runtime schema validation parser 1006 also comprises an XML schema validation module 1012 that performs the actual high level validation process. This module 1012 comprises an element validation module 1014 for validating element lexemes, and an attribute validation module 1016 for validating attribute lexemes.

Figure 11:
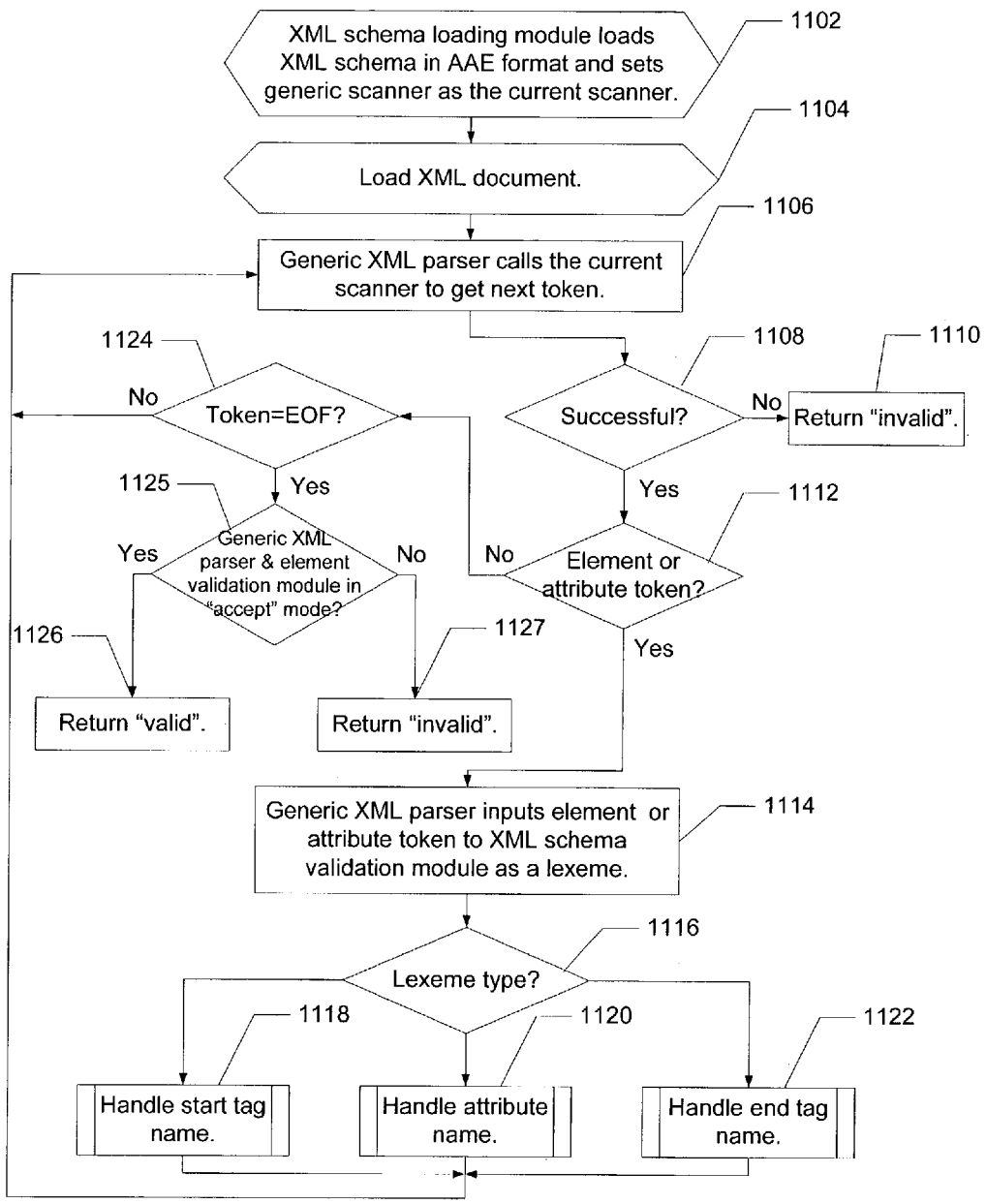
FIG. 11 is a flowchart illustrating a preferred embodiment of the runtime validation process performed by the runtime validation engine in accordance with the present invention.

FIGS. 11-14 are flowcharts illustrating a preferred embodiment of the runtime validation process performed by the runtime validation engine in accordance with the present invention. Referring to FIG. 11, first, the XML schema loading module 1010 loads the XML schema in AAE format 108, and sets the generic scanner 1017 as the current scanner, via step 1102. Also, an Entity Manager 1008 will obtain the XML external entities referenced by the XML document instance to verify. The XML document 112 is loaded, via step 1104. The current scanner tokenizes the XML document 112. Then, the generic XML parser 1004 calls the current scanner to get a token, via step 1106. The generic XML parser 1004 checks if a token is returned successfully, via step 1108. If the token scan is not successful, then the validation return as "invalid", via step 1110, and the process ends. If the token scan is successful, and the generic XML parser 1004 determines that the token is an element or attribute token, via step 1112, then the token is input into the XML schema validation module 1012 as a lexeme, via step 1114. The lexeme can be one of three types: a start tag name, an attribute name, or an end tag name. Each type of lexeme is processed in a different manner, via steps 1118, 1120, or 1122. If the token is not an element or attribute token, then it is determined if the token is the end of file (EOF) token, i.e., the end of the XML document 112, via step 1124. If not, then the process returns to step 1106 and repeats for the next token. If so, then it is determined if the generic XML parser 1004 and the element validation module 1014 are both in the "accept" mode, via step 1125, i.e., if the parsing and validation has completed. If so, then the validation of the XML document 112 is successful, via step 1126, returning a "valid". If not, then the validation fails, via step 1127, returning an "invalid".

Figure 12:
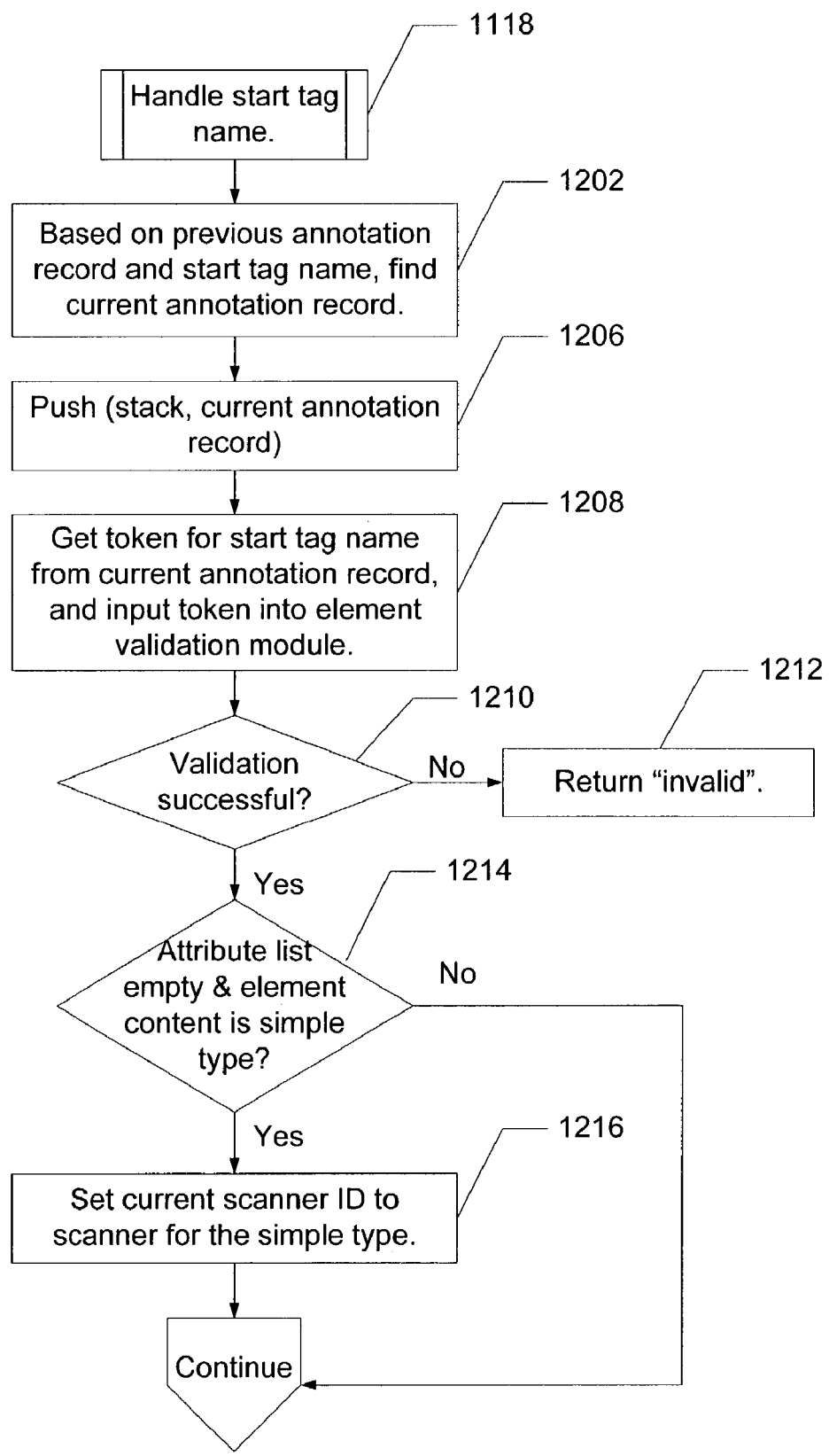
FIG. 12 is a flowchart illustrating the processing of a start tag name in accordance with the present invention.

FIG. 12 is a flowchart illustrating the processing of a start tag name in accordance with the present invention. First, based on the previous annotation record and the start tag name, the XML schema validation module 1012 finds the current annotation record, via step 1202. The current annotation record is the annotation record pointed by the map entry corresponding to the current tag name in the previous annotation record's candidate sub-element map. This current annotation record is pushed onto the stack, via step 1206. The XML schema validation module 1012 then gets the token corresponding to the start tag name from the current annotation record and inputs this token into the element validation module 1014, via step 1208. The element validation module 1014 performs LR parsing according to the parsing table portion of AAE, such as 801. If the validation is not successful, via step 1210, then the validation fails, via step 1212, and an "invalid" is returned. If the validation is successful, via step 1210, then if the attribute list for the current annotation record is empty and the element content is a simple type, via step 1214, then the current scanner ID is set to the scanner for the simple type, via step 1216. The process then continues with step 1106, illustrated in FIG. 11.

Figure 13:
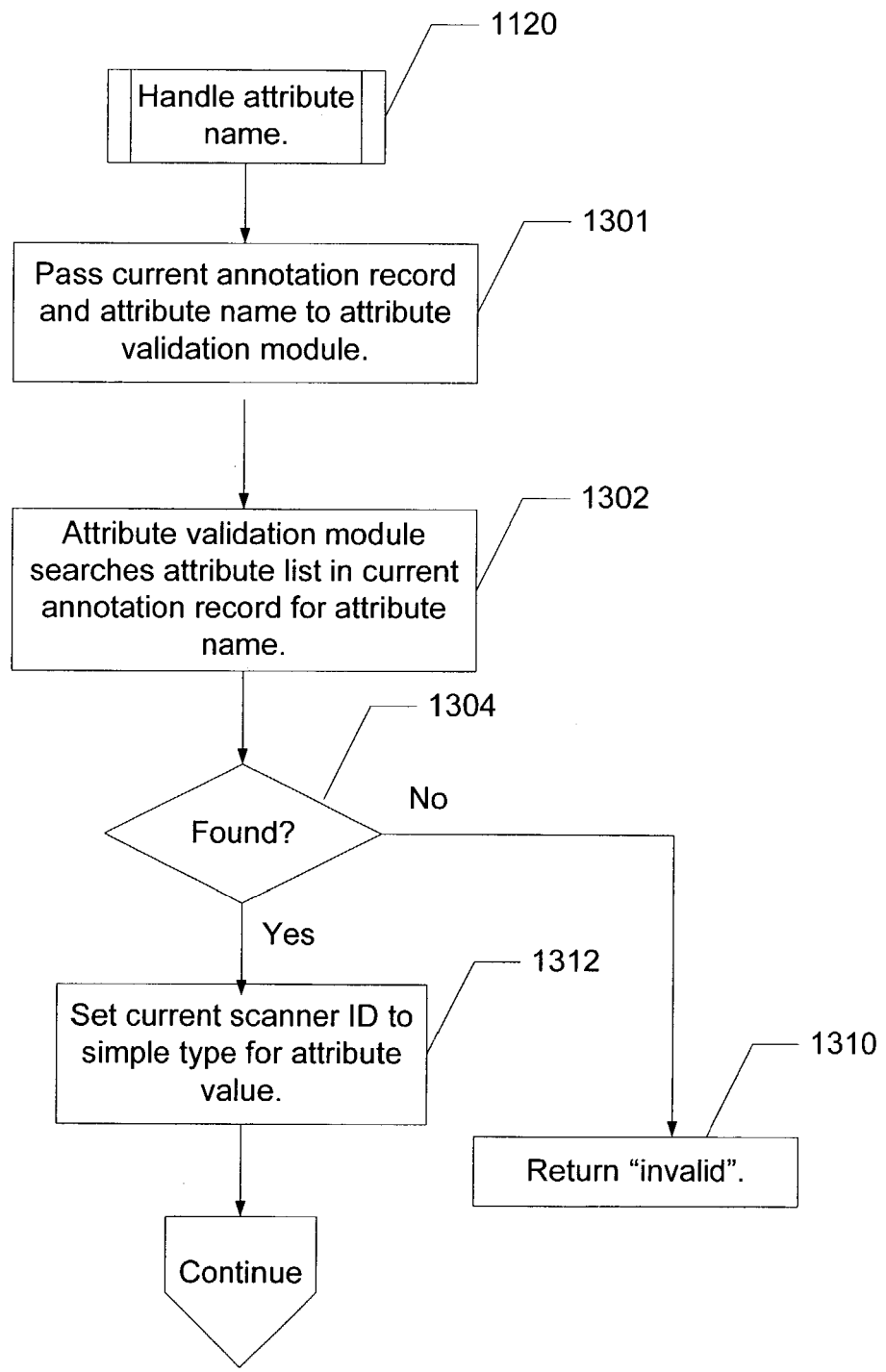
FIG. 13 is a flowchart illustrating the processing of an attribute name in accordance with the present invention.

FIG. 13 is a flowchart illustrating the processing of an attribute name in accordance with the present invention. First, the XML schema validation module 1012 gets the current annotation record, and passes the current annotation record and the attribute name to the attribute validation module 1016, via step 1301. The attribute validation module 1016 searches the attribute list in the current annotation record for the attribute name, via step 1302. If the attribute name is not found in the current annotation record, via step 1304, then the structure of the XML document 112 does not conform to the XML schema definition 108, the validation of the XML document 112 fails, via step 1310, and an "invalid" is returned. If the attribute name is found, via step 1304, then the XML schema validation module 1012 sets the current scanner ID to the simple type for the attribute value, via step 1312. The process then continues with step 1124, illustrated in FIG. 11.

Figure 14:
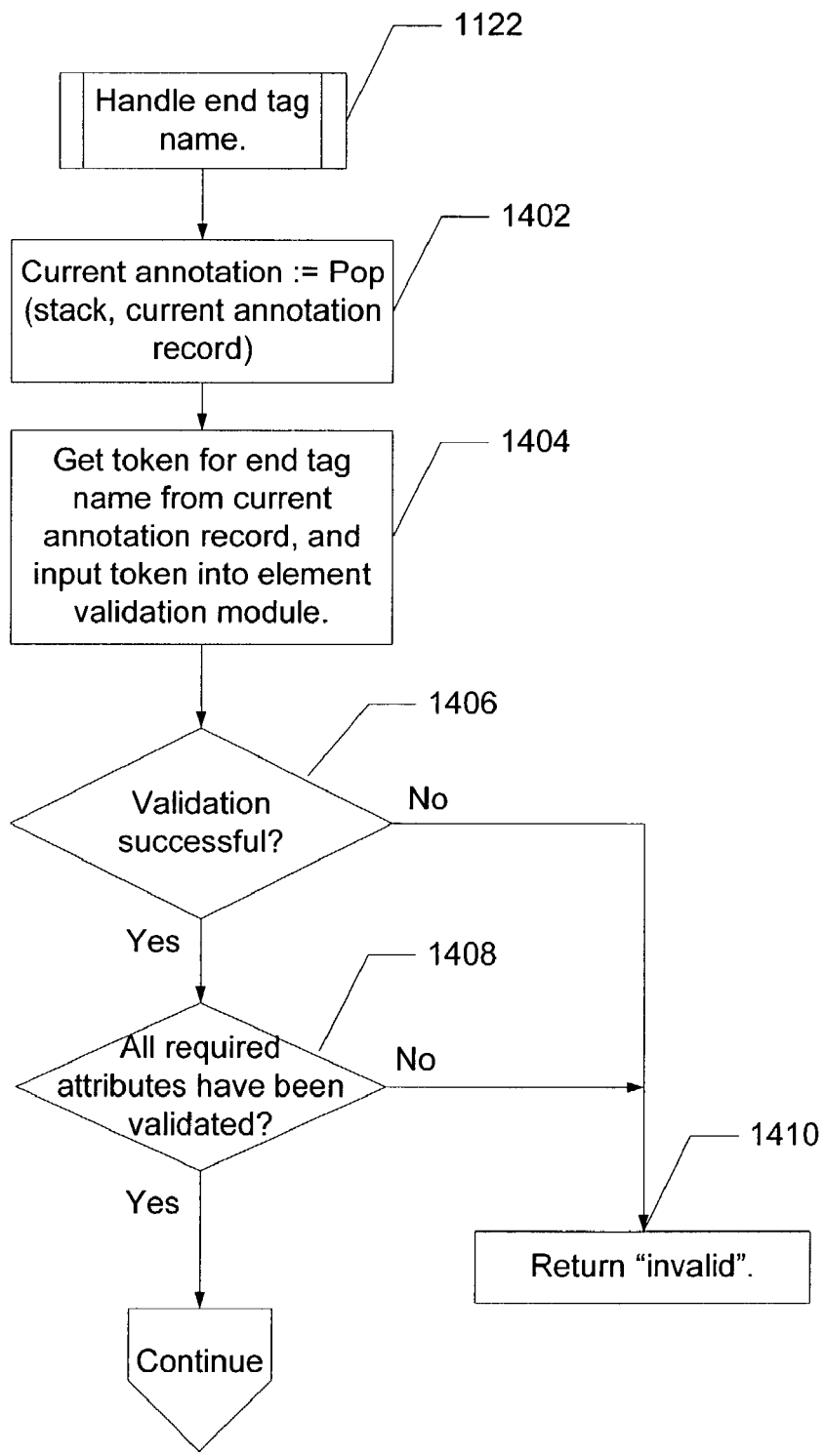
FIG. 14 is a flowchart illustrating the processing of an end tag name in accordance with the present invention.

FIG. 14 is a flowchart illustrating the processing of an end tag name in accordance with the present invention. First, the current annotation record is removed from the stack, via step 1402. According to the AAE format, the end tag of an annotation record is processed after the start tag and any attributes. Since the current annotation record is set according to steps 1202-1204 above, the current annotation record for the eng tag name should be the annotation record for the start tag name. Since the end tag name is the last token of an annotation record to be processed, its annotation record is removed from the stack with its processing. Next, the XML schema validation module 1012 gets the token for the end tag name from the current annotation record and inputs it into the element validation module 1014, via step 1404. If the validation is not successful, via step 1406, then the validation fails, via step 1410, and an "invalid" is returned. If the validation is successful, via step 1406, then the XML schema validation module 1012 determines if all of the attributes for the current annotation record have been validated, or if the attribute list is empty, via step 1408. If not, then the structure of the XML document 112 does not conform to the XML schema definition 108, the validation fails, via step 1410, and an "invalid" is returned. If so, then the process returns to FIG. 11 at step 1106 and repeats for the next token.

To check for uniqueness constraints 430 in the preferred embodiment, such as for the employee element of the XML schema definition 400, a hash table or array may be used to track whether an employee serno has been encountered before.

To check for referential integrity in the preferred embodiment, a list of definitions can be collected as the XML document 112 is scanned. References can then be checked against the definition list. In the case where the references appear before the definition, the entire XML document 112 will have to be scanned and references are remembered before checking for referential integrity.

Example Validation

Figure 16:
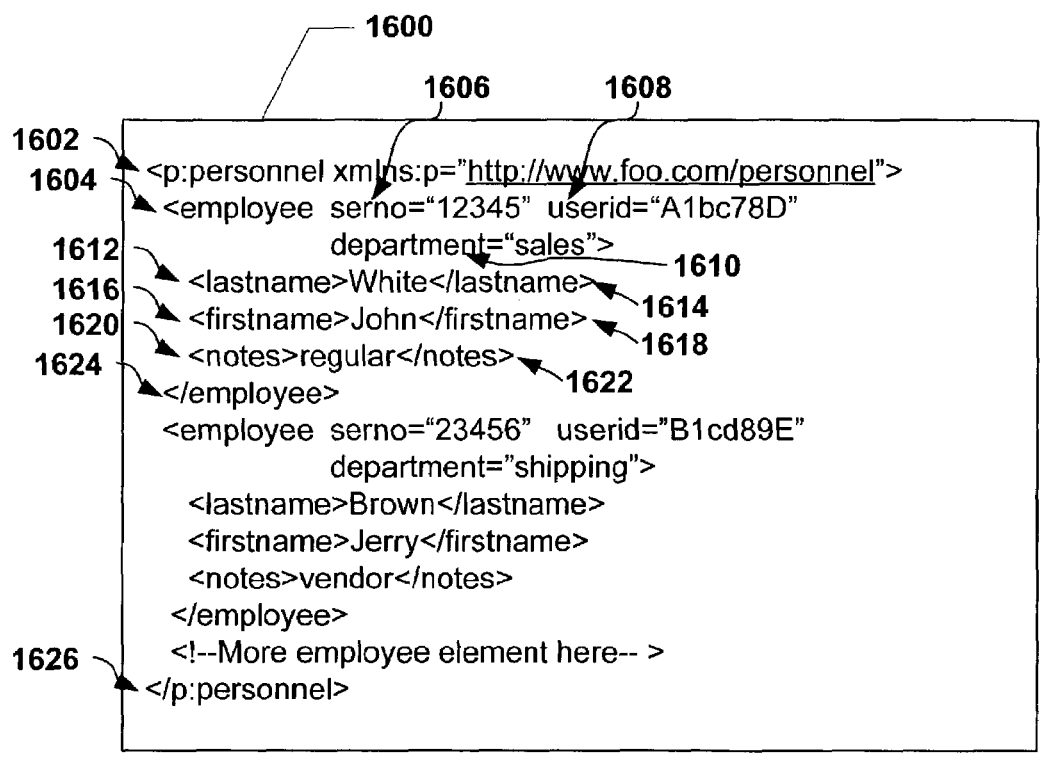
FIG. 16 illustrates an example XML document to be validated.

For example, assume that the XML schema definition for the XML document 112 is the example XML schema definition 400 (FIG. 4). FIG. 16 illustrates an example XML document 1600 to be validated. The XML schema loading module 1012 loads the XML schema in AAE format and sets the generic scanner 1017 as the current scanner, via step 1102. The XML document 1600 is also loaded, via step 1104. The generic XML parser 1004 calls the current scanner to get the first token, via step 1106, which is the personnel start tag name 1602. The token scan is successful, via step 1108, and the generic XML parser 1004 determines that it is an element token, via step 1112, and inputs it into the XML schema validation module 1012 as a lexeme, via step 1114. The XML schema validation module 1012 then determines the lexeme type, via step 1116. Since the lexeme is a start tag name, process step 1118 is performed as illustrated in FIG. 12.

Personnel Start Tag Name

According to the graph 800 for the XML schema definition 400, the previous annotation record for the personnel start tag name 803 points to the personnel element annotation record 809. Referring to FIG. 12, the personnel element annotation record 809 is thus the current annotation record, via step 1202, and is pushed onto the stack, via step 1206. The contents of the stack becomes as illustrated in FIG. 15A. The XML schema validation module 1012 then gets the personnel start tag token (PS) 805 from the personnel element annotation record 809 and inputs the token 805 into the element validation module 1014, via step 1208. The element validation module 1014 is a parser using a parsing table for state transitions, illustrated in FIG. 9. The validation is successful, via step 1210. The attribute list 807 for the personnel element annotation record 809 is empty (null), but the content is of a complex type (anyTypeID), via step 1214. Thus, the validation process returns to FIG. 11 at step 1106 and repeats for the next token.

Employee Start Tag Name

The generic XML parser 1004 calls the current scanner to get the next token, the employee start tag name 1604, via step 1106. The token scan is successful, via step 1108, and the generic XML parser 1004 determines that it is an element token, via step 1112, and inputs it into the XML schema validation module 1012 as a lexeme, via step 114. The XML schema validation module 1012 then determines the lexeme type, via step 1116. Since the lexeme is a start tag name, process step 1118 is performed as illustrated in FIG. 12.

Referring to FIG. 12, the candidate sub-element map 808 of the personnel element annotation record 809, i.e., the previous annotation record, points to the employee start tag name 810, which in turn points to the employee element annotation record 816, i.e., the current annotation record, via step 1202, and is pushed onto the stack, via step 1206. The contents of the stack now becomes as illustrated in FIG. 15B. The XML schema validation module 1012 gets the employee start tag token (ES) 812 from the employee element annotation record 816 and inputs the token 812 into the element validation module 1014, via step 1208. The validation is successful, via step 1210. Since the attribute list 814 for the employee element annotation record 816 is not empty, via step 1214, the process returns to FIG. 11 at step 1106 and repeats for the next token.

Serno Attribute Name

The generic XML parser calls the current scanner to get the next token, the token for the attribute name serno 1606, via step 1106. The token scan is successful, via step 1108, and the generic XML parser 1004 determines that it is an attribute token, via step 1112, and inputs it into the XML schema validation module 1012 as a lexeme, via step 1114. The XML schema validation module 1012 then determines the lexeme type, via step 1116. Since the lexeme is an attribute name, process step 1120 is performed, as illustrated in FIG. 13.

Referring to FIG. 13, the XML schema validation module 1012 passes the current annotation record and the serno attribute name to the attribute validation module 1016, via step 1301. The current annotation record is the employee element annotation record 816. The attribute validation module 1016 searches the attribute list 814 for the serno attribute name 817, via step 1302. The serno attribute name 817 is found there, via step 1304. The validation is successful, and the XML schema validation module 1012 sets the current scanner ID to the integerTypeID, via step 1312. The process then returns to FIG. 11 at step 1106 and repeats for the next token. The IntegerType scanner 1019 scans the integer "12345" as the attribute value for the serno attribute name. The current scanner is reset to the generic scanner.

Userid Attribute Name

The generic XML parser calls the current scanner to get the next token, the token for the attribute name userid 1608, via step 1106. The token scan is successful, via step 1108, and the generic XML parser 1004 determines that it is an attribute token, via step 1112, and inputs it into the XML schema validation module 1012 as a lexeme, via step 1114. The XML schema validation module 1012 then determines the lexeme type, via step 1116. Since the lexeme is an attribute name, process step 1120 is performed, as illustrated in FIG. 13.

Referring to FIG. 13, the XML schema validation module 1012 passes the current annotation record and the userid attribute name 819 to the attribute validation module 106, via step 1301. The current annotation record is the employee element annotation record 816. The attribute validation module 1016 searches the attribute list 814 for the userid attribute name 819, via step 1302. The userid attribute name 819 is found there, via step 1304. The validation is successful, and the XML schema validation module 1012 sets the current scanner ID to the anySimpleTypeID, via step 1312. The process then returns to FIG. 11 at step 1106 and repeats for the next token. The AnySimpleType scanner 1018 scans "A1bc78D" as the attribute value for the userid attribute name. The current scanner is reset to the generic scanner.

Department Attribute Name

The generic XML parser calls the current scanner to get the next token, the token for the attribute name department 1610, via step 1106. The token scan is successful, via step 1108, and the generic XML parser 1004 determines that it is an attribute token, via step 1112, and inputs it into the XML schema validation module 1012 as a lexeme, via step 1114. The XML schema validation module 1012 then determines the lexeme type, via step 1116. Since the lexeme is an attribute name, process step 1120 is performed, as illustrated in FIG. 13.

Referring to FIG. 13, the XML schema validation module 1012 passes the current annotation record and the department attribute name 821 to the attribute validation module 106, via step 1301. The current annotation record is the employee element annotation record 816. The attribute validation module 1016 searches the attribute list 814 for the department attribute name 821, via step 1302. The department attribute name 821 is found there, via step 1304. The validation is successful, via step 1308, and the XML schema validation module 1012 sets the current scanner ID to the stringTypeID, via step 1312. The process then returns to FIG. 11 at step 1106 and repeats for the next token. The StringType scanner 1020 scans "sales" as the attribute value for the department attribute name. The current scanner is reset to the generic scanner.

Lastname Start Tag Name

The generic XML parser calls the current scanner to get the next token, the token for the lastname start tag name 1612, via step 1106. The token scan is successful, via step 1108, and the generic XML parser 1004 determines that it is an element token, via step 1112, and inputs it into the XML schema validation module 1012 as a lexeme, via step 1114. The XML schema validation module 1012 then determines the lexeme type, via step 1116. Since the lexeme is a start tag name, process step 1118 is performed, as illustrated in FIG. 12.

Referring to FIG. 12, the candidate sub-element map 815 of the employee element annotation record 816, i.e., the previous annotation record, points to the lastname start tag name 823, which in turn points to the lastname element annotation record 829, i.e., the current annotation record, via step 1202, and is pushed onto the stack, via step 1206. The contents of the stack now becomes as illustrated in FIG. 15C. The XML schema validation module 1012 gets the lastname start tag token (LS) 825 from the lastname element annotation record 829 and inputs the token 825 into the element validation module 1014, via step 1208. The validation is successful, via step 1210. Since the attribute list 814 for the lastname element annotation record 829 is empty and the content of the lastname element is a simple type (stringTypeID), via step 1214, the current scanner ID is changed to stringType ID, via step 1216. The process then returns to FIG. 11 at step 1106 and repeats for the next token. The StringType scanner 1020 is then called to scan "White" as the content for the lastname element. The current scanner is reset to the generic scanner.

Lastname End Tag Name

The generic XML parser calls the current scanner to get the next token, the token for the lastname end tag name 1614, via step 1106. The token scan is successful, via step 1108, and the generic XML parser 1004 determines that it is an element token, via step 1112, and inputs it into the XML schema validation module 1012 as a lexeme, via step 1114. The XML schema validation module 1012 then determines the lexeme type, via step 1116. Since the lexeme is an end tag name, process step 1122 is performed, as illustrated in FIG. 14.

Referring to FIG. 14, the lastname element annotation record 829, i.e., the current annotation record, is removed from the stack, via step 1402. The contents of the stack now becomes as illustrated in FIG. 15B. The XML schema validation module 1012 gets the lastname end tag token (LE) 826 from the lastname element annotation record 829 and inputs the token 826 into the element validation module 1014, via step 1404. The validation is successful, via step 1406. Since the attribute list 827 for the lastname element annotation record 829 is empty, via step 1408, the process returns to FIG. 11 at step 1106 and repeats for the next token.

Firstname Start Tag Name

The generic XML parser calls the current scanner to get the next token, the token for the firstname start tag name 1616, via step 1106. The token scan is successful, via step 1108, and the generic XML parser 1004 determines that it is an element token, via step 1112, and inputs it into the XML schema validation module 1012 as a lexeme, via step 1114. The XML schema validation module 1012 then determines the lexeme type, via step 1116. Since the lexeme is a start tag name, process step 1118 is performed, as illustrated in FIG. 12.

Referring to FIG. 12, the candidate sub-element map 815 of the employee element annotation record 816, i.e., the previous annotation record, points to the firstname start tag name 830, which in turn points to the firstname element annotation record 837, i.e., the current annotation record, via step 1202, and is pushed onto the stack, via step 1206. The contents of the stack now become as illustrated in FIG. 15D. The XML schema validation module 1012 gets the firstname start tag token (FS) 833 from the firstname element annotation record 837 and inputs the token 833 into the element validation module 1014, via step 1208. The validation is successful, via step 1210. Since the attribute list 835 for the firstname element annotation record 837 is empty and the content of the firstname element is a simple type (stringTypeID), via step 1214, the current scanner ID is changed to stringType ID, via step 1216. The process then returns to FIG. 11 at step 1106 and repeats for the next token. The StringType scanner 1020 is then called to scan "John" as the content for the firstname element. The current scanner is reset to the generic scanner.

Firstname End Tag Name

The generic XML parser calls the current scanner to get the next token, the token for the firstname end tag name 1618, via step 1106. The token scan is successful, via step 1108, and the generic XML parser 1004 determines that it is an element token, via step 1112, and inputs it into the XML schema validation module 1012 as a lexeme, via step 1114. The XML schema validation module 1012 then determines the lexeme type, via step 1116. Since the lexeme is an end tag name, process step 1122 is performed, as illustrated in FIG. 14.

Referring to FIG. 14, the firstname element annotation record 837, i.e., the current annotation record, is removed from the stack, via step 1402. The contents of the stack now becomes as illustrated in FIG. 15B. The XML schema validation module 1012 gets the firstname end tag token (SE) 834 from the firstname element annotation record 837 and inputs the token 834 into the element validation module 1014, via step 1404. The validation is successful, via step 1406. Since the attribute list 835 for the firstname element annotation record 837 is empty, via step 1408, the process returns to FIG. 11 at step 1106 and repeats for the next token.

Notes Start Tag Name

The generic XML parser calls the current scanner to get the next token, the token for the notes start tag name 1620, via step 1106. The token scan is successful, via step 1108, and the generic XML parser 1004 determines that it is an element token, via step 1112, and inputs it into the XML schema validation module 1012 as a lexeme, via step 1114. The XML schema validation module 1012 then determines the lexeme type, via step 1116. Since the lexeme is a start tag name, process step 1118 is performed, as illustrated in FIG. 12.

Referring to FIG. 12, the candidate sub-element map 815 of the employee element annotation record 816, i.e., the previous annotation record, points to the notes start tag name 838, which in turn points to the notes element annotation record 843, i.e., the current annotation record, via step 1202, and is pushed onto the stack, via step 1206. The contents of the stack now become as illustrated in FIG. 15E. The XML schema validation module 1012 gets the notes start tag token (NS) 839 from the notes element annotation record 843 and inputs the token 839 into the element validation module 1014, via step 1208. The validation is successful, via step 1210. Since the attribute list 835 for the notes element annotation record 843 is empty and the content of the notes element is a simple type (stringTypeID), via step 1214, the current scanner ID is changed to stringType ID, via step 1216. The process then returns to FIG. 11 at step 1106 and repeats for the next token. The StringType scanner 1020 scans "regular" as the content for the notes element. The current scanner is reset to the generic scanner.

Notes End Tag Name

The generic XML parser calls the current scanner to get the next token, the token for the notes end tag name 1622, via step 1106. The token scan is successful, via step 1108, and the generic XML parser 1004 determines that it is an element token, via step 1112, and inputs it into the XML schema validation module 1012 as a lexeme, via step 1114. The XML schema validation module 1012 then determines the lexeme type, via step 1116. Since the lexeme is an end tag name, process step 1122 is performed, as illustrated in FIG. 14.

Referring to FIG. 14, the notes element annotation record 843, i.e., the current annotation record, is removed from the stack, via step 1402. The contents of the stack now becomes as illustrated in FIG. 15B. The XML schema validation module 1012 gets the notes end tag token (NE) 840 from the notes element annotation record 843 and inputs the token 840 into the element validation module 1014, via step 1404. The validation is successful, via step 1406. Since the attribute list 841 for the notes element annotation record 843 is empty, via step 1408, the process returns to FIG. 11 at step 1106 and repeats for the next token.

Employee End Tag Name

The generic XML parser calls the current scanner to get the next token, the token for the employee end tag name 1624, via step 1106. The token scan is successful, via step 1108, and the generic XML parser 1004 determines that it is an element token, via step 1112, and inputs it into the XML schema validation module 1012 as a lexeme, via step 1114. The XML schema validation module 1012 then determines the lexeme type, via step 1116. Since the lexeme is an end tag name, process step 1122 is performed, as illustrated in FIG. 14.

Referring to FIG. 14, the employee element annotation record 816, i.e., the current annotation record, is removed from the stack, via step 1402. The contents of the stack now becomes as illustrated in FIG. 15A. The XML schema validation module 1012 gets the employee end tag token (EE) 813 from the employee element annotation record 816 and inputs the token 813 into the element validation module 1014, via step 1404. The validation is successful, via step 1406. Since all of the attributes 817, 819, and 821 for the employee element annotation record 816 have been validated, via step 1408, the process returns to FIG. 11 at step 1106 and repeats for the next token.

A similar validation process is performed for the remaining employee elements under the personnel element in the example XML document 1600.

Personnel End Tag Name

The generic XML parser calls the current scanner to get the next token, the token for the personnel end tag name 1626, via step 1106. The token scan is successful, via step 1108, and the generic XML parser 1004 determines that it is an element token, via step 1112, and inputs it into the XML schema validation module 1012 as a lexeme, via step 1114. The XML schema validation module 1012 then determines the lexeme type, via step 1116. Since the lexeme is an end tag name, process step 1122 is performed, as illustrated in FIG. 14.

Referring to FIG. 14, the personnel element annotation record 809, i.e., the current annotation record, is removed from the stack, via step 1402. The XML schema validation module 1012 gets the personnel end tag token (PE) 806 from the personnel element annotation record 809 and inputs the token 806 into the element validation module 1014, via step 1404. The validation is successful, via step 1406. Since the attribute list 807 for the personnel element annotation record 809 is empty, via step 1408, the process returns to FIG. 11 at step 1106 and repeats for the next token. An EOF token is then returned. Since both the generic XML parser 1004 and the element module 1014 are in the "accept" mode, via step 1125, the process completes with the validation of the XML document 1600. A "valid" is thus returned, via step 1126.

Advanced Features

Although the preferred embodiment has been described above with a simple XML schema definition, some advanced features may be supported by the present invention as well. For example, a declaration of an element with derived types, or an abstract type and/or abstract elements and substitution groups may be supported.

Type derivation allows new types to be defined using base types. When declaring an element of a type with derived types, the declaration only references the base type, which can be abstract. If an element is declared as a type with derived types, then the xsi:type attribute must be used to determine which derived type of the abstract type is used in an XML instance. In other words, the data type of an element cannot be determined solely by the element's name. However, which element is declared by the abstract type is known when the XML schema definition is compiled. Thus, this information is encoded into the global and local element maps by the abstract type field. If the runtime validation engine 104 finds that an element is declared using an abstract type at runtime, then it will defer the validation of this element's attributes until xsi:type is found.

For example, FIG. 17 illustrates a portion of example derived type definitions for an XML schema definition. In this example, instead of a single type for the employee element, three types are defined: employeeType, regularEmployee, and tempEmployee. The declaration of employee element refers to the base type "employeeType".

To support derived types in the XML schema validation in accordance with the present invention, the XML schema compilation 102 uses an OR ("|") for the employee element in the CFG:

| employee: | employeeType |
|---|---|
| | \| regularEmployee |
| | \| tempEmployee |

The BNF for both regularEmployee and tempEmployee will be expanded to include all the elements they contain. For example, regularEmployee will be expanded to include all four elements: lastname, firstname, notes, and salary. According to the restrictions on XML schemas by the XML schema recommendation, there should not be any look ahead required on resulting CFGs for an XML schema to be legal. That means the resulting CFG should be within the capability of an SLR or LALR(1) parser generator, or the XML schema definition is in error. The rest of the schema compilation will remain the same.

For the runtime validation engine 104, validation of the employee element may be accomplished in two alternative ways. In the first way, a backtracking mechanism is used. When the runtime validation engine 104 encounters an element that can be any of the derived types, it scans the start tag for xsi.,type attributes. Based on the value of these attributes, it generates the corresponding lexeme for the runtime schema validation parser 1006. It then will re-scan the start tag after the tag name. For example, if the following start tag is encountered:

<employee xsi:type="regularEmployee"> then a regularEmployee lexeme is passed to the high level validation parser.

In the second way, the generic XML parser 1004 treats the entire start tag as a whole and the validation parser 1006 validates its contents. The generic XML parser 1004 knows the value of the xsi:type attributes and generates the right token for the runtime schema validation parser 1006. The runtime schema validation parser 1006 then validates the entire start tag.

For an abstract element and a substitution group of elements, a similar mechanism can be applied in schema compilation by the XML schema compilation 102. However, unlike with abstract types, the element's type can be known from the element name. Thus, there is no need to scan for the xsi:type attribute.

Although the present invention is described above in the context of XML schemas, one of ordinary skill in the art will understand that the validation process may also be used with other tagged and/or markup languages that utilize schemas without departing from the spirit and scope of the present invention.

CONCLUSION

An improved method and system for XML schema validation has been disclosed. The method and system compiles XML schema definitions into an Annotated Automaton Encoding (AAE) format, which are stored in a disk or database. Each XML schema definition is compiled once into the AAE format. When an XML document is validated, the XML document and the appropriate XML schema definition in AAE format are loaded into the runtime validation engine. The runtime validation engine comprises a generic XML parser and a runtime schema validation parser. The code for the runtime validation engine is fixed and does not vary depending on the XML schema definition. The generic XML parser performs a low level validation while the runtime schema validation parser performs a high level validation of the XML document against the XML schema definition in AAE format. The output of the runtime validation engine is a validation pass or fail.

Because the XML schema definitions in AAE format are compiled once and stored, rather than being compiled each time an XML document is validated, significant time is saved in performing the validation process. In addition, because the runtime validation engine code is fixed, rather than varying for each XML schema definition, space overhead is minimized, even if there are a large number of XML schema definitions. Also, flexibility in the validation process is provided without compromising performance.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for validating a markup language document against a markup language schema definition, the method comprising:
    loading the markup language document into a runtime validation engine, the runtime validation engine comprising a markup language schema validation parser;
    loading an annotated automaton encoding corresponding to the markup language schema definition into the markup language schema validation parser; and
    the markup language schema validation parser utilizing the annotated automaton encoding to validate the markup language document against the markup language schema definition including ensuring that the markup language document complies with a format specified by the markup language schema definition.

2. The method of claim 1, wherein the markup language comprises an Extensible Markup Language (XML).

3. The method of claim 1, wherein the annotated automaton encoding comprises an element node, including one or more attributes, and wherein one or more data type constraints are associated with the element node or the one or more attributes.

4. The method of claim 3, wherein the annotated automaton encoding comprises an element annotation record for the element node, the element annotation record comprising one or more of:
    a scanner ID for an element content and argument;
    a start tag token;
    an end tag token;
    an attribute list; and
    a candidate sub-element map, comprising a pointer to a sub-element name.

5. The method of claim 1, further comprising:
    receiving the markup language schema definition;
    generating an element structure hierarchy for the markup lananage schema definition and representing the element structure hierarchy in an annotated tree;
    encoding the annotated tree, and generating the annotated automaton encoding corresponding to the markup language schema definition including serializing the annotated automaton encoding; and
    storing the annotated automaton encoding.

6. The method of claim 1, further comprising:
    tokenizing the markup language document to generate a token;
    a generic XML parser performing a first validation of the token, the generic XML parser being associated with the runtime validation engine; and
    the markup language schema validation parser performing a second validation of the token responsive to the token being an element token or an attribute token.

7. The method of claim 6, further comprising:
    outputting a validation pass indicating that the markup language document complies with the format specified by the markup language schema definition responsive to the first validation and the second validation being successful; and
    outputting a validation fail indicating that the markup language document does not comply with the format specified by the markup language schema definition responsive to the first validation and the second validation not being successful.

8. The method of claim 6, wherein the element token comprises one or more of:
    a start tag name; and
    an end tag name.

9. The method of claim 6, wherein the attribute token comprises an attribute name.

10. The method of claim 6, wherein responsive to the element token being a start tag name, then the markup lanauage schema validation parser performing a second validation comprises:
    finding a current annotation record based upon a previous annotation record and the start tag name;
    pushing the current annotation record onto a stack;
    obtaining a start tag token for the start tag name from the current annotation record;
    inputting the start tag token into an element validation module associated with the markup language schema validation parser; and
    determining if a validation of the start tag token is successful.

11. The method of claim 6, wherein responsive to the attribute token being an attribute name, then the markup language schema validation parser performing a second validation comprises:
    passing a current annotation record and the attribute name to an attribute validation module associated with the markup language schema validation parser; and
    searching an attribute list of the current annotation record for the attribute name, wherein the validation of the markup language document fails responsive to the attribute name not being found in the current annotation record.

12. The method of claim 6, wherein responsive to the element token being an end tag name, then the markup language schema validation parser performing a second validation comprises:
    removing a current annotation record from a stack;
    obtaining an end tag token from the current annotation record;
    inputting the end tag token into an element validation module associated with the markup language schema validation parser;
    determining if the validation of the end tag token is successful; and
    determining if all attributes of the current annotation record has been validated or if an attribute list of the current annotation record is empty, wherein the validation of the end tag token is not successful if less than all of the attributes of the current annotation record has been validated and the attribute list of the current annotation record is not empty.

13. A system for validating a markup language document against a markup language schema definition, the system comprising:
a markup language schema compilation for generating an annotated automaton encoding corresponding to the markup language schema definition; and
a runtime validation engine comprising a markup language schema validation parser, the runtime validation engine to receive the markup language document and the annotated automaton encoding as input,
wherein the markup language schema validation parser associated with the runtime validation engine utilizes the annotated automaton encoding to validate the markup language document against the markup language schema definition including ensuring that the markup language document complies with a format specified by the markup language schema definition.

14. The system of claim 13, wherein the markup language comprises an Extensible Markup Language (XML).

15. The system of claim 13, wherein the annotated automaton encoding comprises an element node, including one or more attributes and wherein one or more data type constraints are associated with the element node or the one or more attributes.

16. The system of claim 13, wherein the annotated automaton encoding comprises an element annotation record for the element node, the element annotation record comprising one or more of:
a scanner ID for an element content and argument;
a start tag token;
an end tag token;
an attribute list; and
a candidate sub-element map, comprising a pointer to a sub-element name.

17. The system of claim 13, wherein the markup language schema compilation comprises:
an Extensible Markup Language (XML) schema compiler front-end, the XML schema compiler front-end to,
receive the markup language schema definition;
generate an element structure hierarchy corresponding to the markup lanauage schema definition; and
represent the element structure hierarchy in an annotated tree; and an XML schema compiler back-end, the XML schema compiler back-end to,
encode the annotated tree and generate the annotated automaton encoding from the encoded annotated tree; and
serialize the annotated automaton encoding.

18. The system of claim 17, further comprising:
a storage medium to store the annotated automaton encoding.

19. The system of claim 13, wherein the runtime validation engine further comprises:
a generic Extensible Markup Language (XML) parser, to perform a first validation of the markup language document,
wherein the markup language schema validation parser performs a second validation of the XML the markup language document.

20. The system of claim 13, wherein the markup language schema validation parser comprises:
an Extensible Markup Language (XML) schema loading module to load the annotated automaton encoding; and
an XML schema validation module, comprising:
an element validation module to validate an element token derived from the markup language document, and
an attribute validation module to validate an attribute token derived from the markup language document.

21. The system of claim 20, wherein the element token comprises one or more of:
a start tag name; and
an end tag name.

22. The system of claim 20, wherein the attribute token comprises an attribute name.

23. The system of claim 13, wherein the runtime validation engine further comprises an Extensible Markup Language (XML) scanner pool, the XML scanner pool including,
a generic scanner capable of scanning all lexical tokens derived from the markup language document; and
type specific scanner to scan a token derived from the markup language document having a type corresponding to the type specific scanner.

24. A computer readable medium with program instructions tangibly stored thereon for validating a markup language document against a markup language schema definition, the computer readable medium comprising instructions for:
loading the markup language document into a runtime validation engine, the runtime validation engine comprising a markup language schema validation parser;
loading an annotated automaton encoding corresponding to the markup language schema definition into the markup language schema validation parser; and
the markup language schema validation parser utilizing the annotated automaton encoding to validate the markup language document against the markup language schema definition including ensuring that the markup language document complies with a format specified by the markup language schema definition.

25. The computer readable medium of claim 24, wherein the markup language comprises an Extensible Markup Language (XML).

26. The computer readable medium of claim 24, wherein the annotated automaton encoding comprises an element node, including one or more attributes, and wherein one or more data type constraints are associated with the element node or the one or more attributes.

27. The computer readable medium of claim 26, wherein the annotated automaton encoding comprises an element annotation record for the element node, the element annotation record comprising one or more of:
a scanner ID for an element content and argument;
a start tag token;
an end tag token;
an attribute list; and
a candidate sub-element map comprising a pointer to a sub-element name.

28. The computer readable medium of claim 24, further comprising instructions for:
receiving the markup language schema definition;
generating an element structure hierarchy for the markup language schema definition and representing the element structure hierarchy in an annotated tree;
encoding the annotated tree, and generating the annotated automaton encoding corresponding to the markup language schema definition including serializing the annotated automaton encoding; and
storing the annotated automaton encoding.

29. The computer readable medium of claim 24, further comprising instructions for:
  tokenizing the markup language document to generate a token;
  a generic XML parser performing a first validation of the token, the generic XML parser being associated with the runtime validation engine; and
  the markup language schema validation parser performing a second validation of the token responsive to the token being an element token or an attribute token.

30. The computer readable medium of claim 29, further comprising instructions for:
  outputting a validation pass indicating that the markup language document complies with the format specified by the markup language schema definition responsive to the first validation and the second validation being successful; and
  outputting a validation fail indicating that the markup language document does not comply with the format specified by the markup language schema definition responsive to the first validation and the second validation not being successful.

31. The computer readable medium of claim 29, wherein the element token comprises one or more of:
  a start tag name; and
  an end tag name.

32. The computer readable medium of claim 29, wherein the attribute token comprises an attribute name.

33. The computer readable medium of claim 29, wherein responsive to the element token being a start tag name, then the instructions for the markup language schema validation parser performing a second validation comprises instructions for:
  finding a current annotation record based upon a previous annotation record and the start tag name;
  pushing the current annotation record onto a stack;
  obtaining a start tag token for the start tag name from the current annotation record;
  inputting the start tag token into an element validation module associated with the markup language schema validation parser; and
  determining if a validation of the start tag token is successful.

34. The computer readable medium of claim 29, wherein responsive to the attribute token being an attribute name, then the instructions for the markup language schema validation parser performing a second validation comprises instructions for:
  passing a current annotation record and the attribute name to an attribute validation module associated with the markup language schema validation parser; and
  searching an attribute list of the current annotation record for the attribute name, wherein the validation of the markup language document fails responsive to the attribute token not being found in the current annotation record.

35. The computer readable medium of claim 29, wherein responsive to the element token being an end tag name, then the instructions for the markup language schema validation parser performing a second validation comprises instructions for:
  removing a current annotation record from a stack;
  obtaining an end tag token from the current annotation record;
  inputting the end tag token into an element validation module associated with the markup language schema validation parser;
  determining if the validation of the end tag token is successful; and
  determining if all attributes of the current annotation record has been validated or if an attribute list of the current annotation record is empty, wherein the validation of the end tag token is not successful if less than all of the attributes of the current annotation record has been validated and the attribute list of the current annotation record is not empty.

* * * * *